United States Patent

Farmer

[15] 3,683,182
[45] Aug. 8, 1972

[54] MARKING DEVICES FOR X-RAY FILM
[72] Inventor: Robert B. Farmer, Glenview, Ill.
[73] Assignee: Katum Corporation, Wilmette, Ill.
[22] Filed: Sept. 11, 1969
[21] Appl. No.: 857,164

[52] U.S. Cl.....................................250/67, 250/68
[51] Int. Cl. ................................................H05g 1/28
[58] Field of Search..................................250/67, 68

[56] References Cited

UNITED STATES PATENTS

| 3,452,196 | 6/1969 | Gray | 250/67 |
| 3,504,180 | 3/1970 | Tone | 250/68 |
| 3,488,753 | 1/1970 | Tone et al. | 250/67 |

*Primary Examiner*—James W. Lawrence
*Assistant Examiner*—C. E. Church
*Attorney*—Burmeister, Palmatier & Hamby

[57] ABSTRACT

The X-ray film is enclosed within a light-tight holding device, so arranged that the X-ray exposure is made with the film therein. An electro-luminescent lamp in the form of a flat plate is mounted in the holding device, which has a light-trap slot for the insertion of an identification card between the lamp and the film. The lamp is energized in connection with the X-ray exposure, so that a latent photographic image is produced on the film, to correspond with the identifying markings on the card. In one embodiment, the electro-luminescent lamp is mounted within a cassette, adapted to hold an X-ray film. The identification card is movable into direct engagement with the film. The cassette is provided with contacts whereby the lamp is connected to an energizing circuit when the cassette is mounted in its exposure position. In another embodiment, a fiber optic plate is provided between the identification card and the film to transmit an image of the identifying markings to the film. This construction makes it possible to feed the film into and out of the holding device, from a supply magazine to a receiving magazine.

4 Claims, 10 Drawing Figures

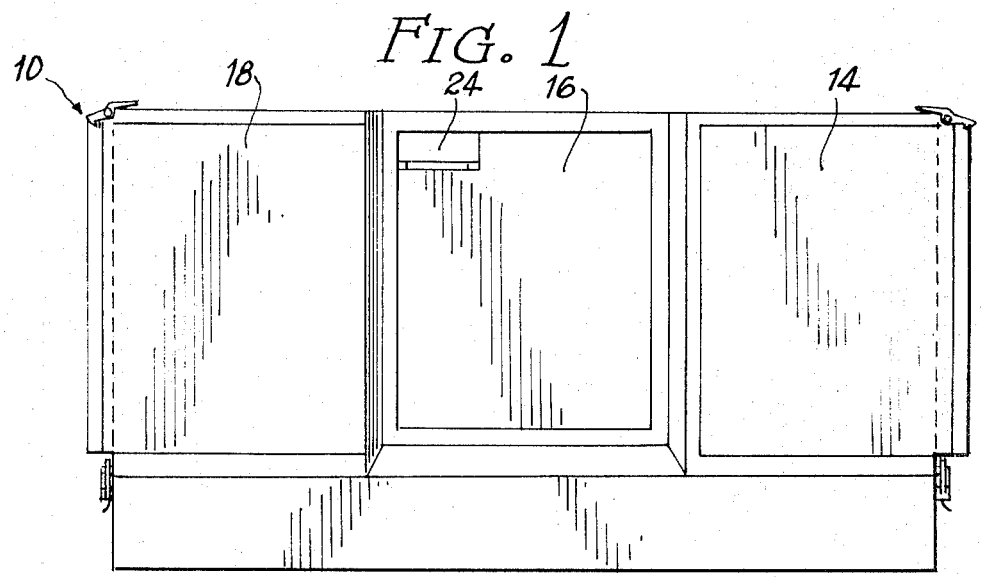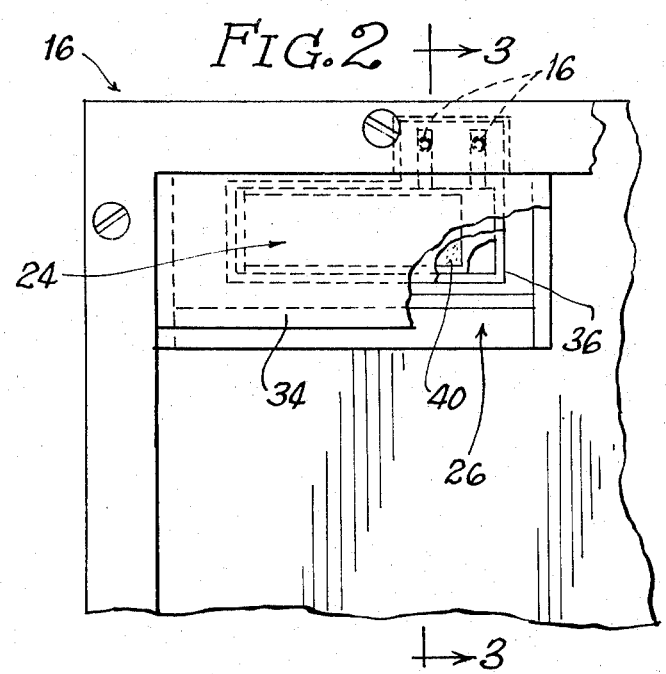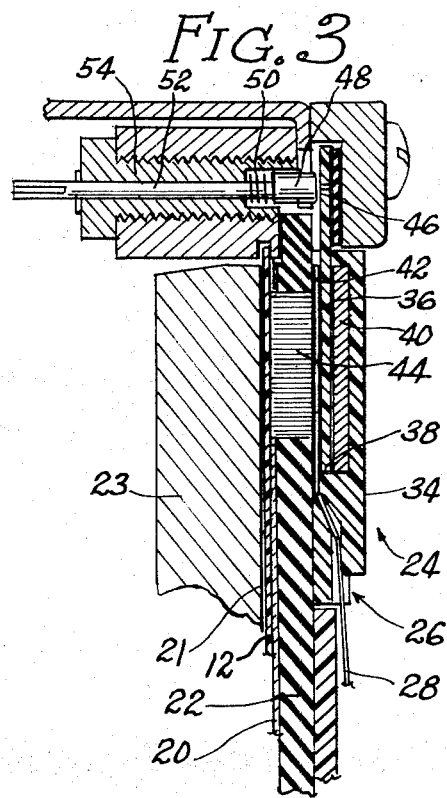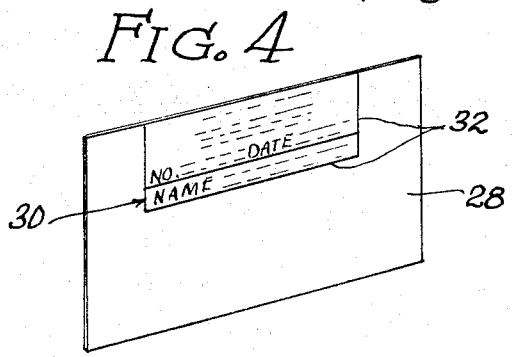

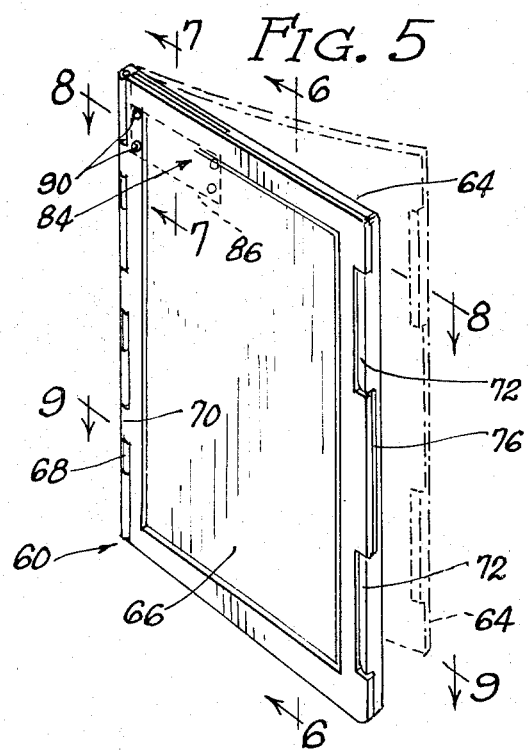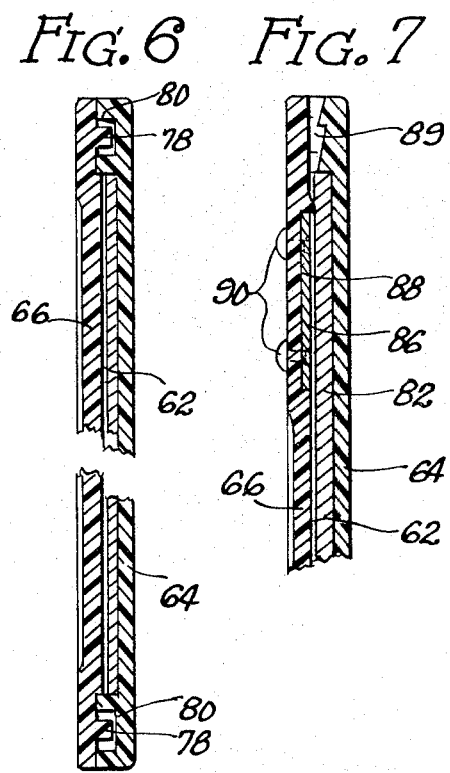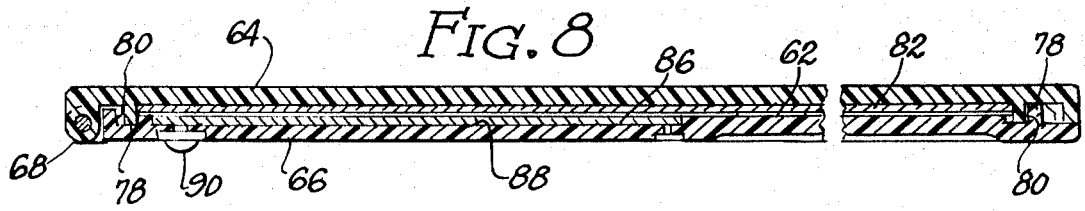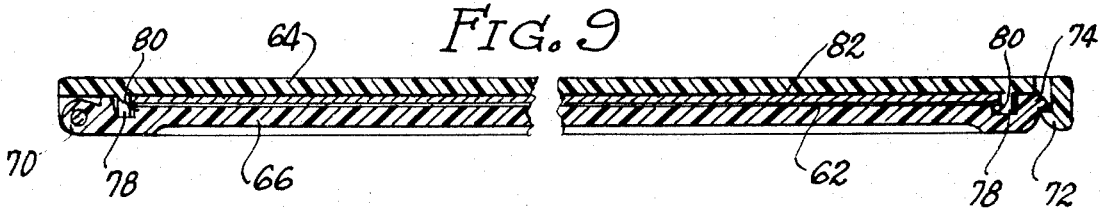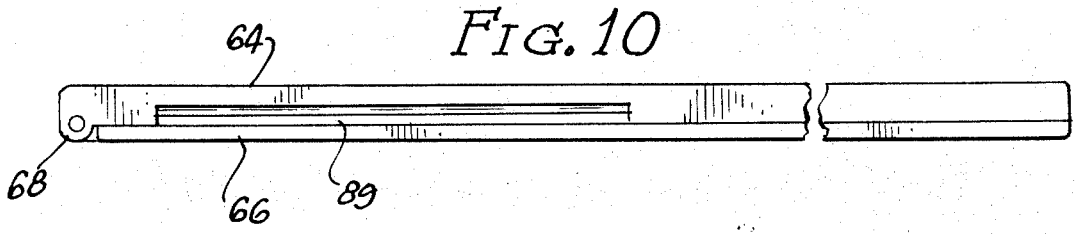

MARKING DEVICES FOR X-RAY FILM

This invention relates to marking devices whereby various identifying markings are produced on an X-ray film, simultaneously with the X-ray exposure of the film. The markings may include the name of the patient, the date, the sequence number, and any other desired data.

Various marking devices have been provided in the prior art, but none has been entirely satisfactory. One object of the present invention is to provide a marking device which functions efficiently and automatically, with only the requirement that an identification card, bearing the desired markings, is inserted into the device through a light-trap slot. The marking devices of the present invention are efficient, foolproof, compact, and economical.

In accordance with the present invention, the marking device utilizes a light-tight holding device in which the X-ray film is contained during the X-ray exposure. An electro-luminescent lamp is mounted in the holding device, adjacent one side of the X-ray film. The lamp is in the form of a flat plate and is extremely compact. The holding device is provided with a recess for receiving the lamp. The idenficiation card is inserted into the holding device through a light-trap slot. In this way, the portion of the card, bearing the identifying markings, is moved between the lamp and the film. The lamp is energized, preferably during the X-ray exposure, so as to produce a latent photographic image of the markings on an edge portion of the film.

In one embodiment, the holding device is disposed between a supply magazine and a receiving magazine. Successive X-ray films are fed into and out of the holding device. A fiber optic plate is provided between the identification card and the film so that the image of the identifying markings is transmitted to the film. This arrangement prevents the film from snagging on the identification card. Thus, the film can be fed along the fiber optic plate, without any snagging or other malfunction.

In another embodiment, the invention is incorporated into a cassette for holding a single X-ray film. The cassette comprises front and rear members, each preferably molded in one piece of a resinous plastic material. The electro-luminescent lamp is mounted in a recess formed in one of the members. A light-trap slot is provided so that an identification card or the like can be inserted between the lamp and the X-ray film. Contacts are provided on the cassette and are connected to the lamp so that an energizing voltage can be supplied to the lamp when the cassette is inserted into the exposure position in the X-ray apparatus. In this case the identification card preferably engages the film directly, so that a fiber optic plate is not necessary.

The cassette preferably comprises hinge elements, disposed between the front and rear members along one edge thereof. Flexible detent flanges are provided along the opposite edge for holding the cassette in its closed position. It is preferred to provide tongue and groove elements around the periphery of the cassette to provide a light seal between the front and back members.

Further objects, advantages and features of the present invention will appear from the following description, taken with the accompanying drawings, in which:

FIG. 1 is an elevational view of a transporting apparatus for X-ray films, such apparatus constituting one illustrative embodiment of the present invention.

FIG. 2 is an enlarged fragmentary elevation corresponding to a portion of FIG. 1, with certain portions broken away for clarity of illustration.

FIG. 3 is a fragmentary section, taken generally along the line 3—3 of FIG. 2.

FIG. 4 is a perspective view of an identification card, adapted to be employed in connection with the apparatus of FIGS. 1–3.

FIG. 5 is a perspective view of an X-ray film cassette constituting another embodiment of the present invention.

FIGS. 6–9 are fragmentary sections, taken respectively along the lines 6—6, 7—7, 8—8, and 9—9 in FIG. 5.

FIG. 10 is a fragmentary plan view of the cassette shown in FIG. 5.

As just indicated, FIG. 1 illustrates the invention as embodied in a machine 10 for transporting or handling X-ray films 12 (FIG. 3). A supply magazine 14 is provided to hold a pack of the films 12. It will be understood that other suitable means may be provided to hold the films. The films 12 are transported into a light-tight enclosure or casing 16 which provides the exposure station, at which the X-rays impinge upon the X-ray films. After being exposed, the films are transported into a receiving magazine 18.

The machine 10 of FIG. 1 may be of the type disclosed and claimed in the Farmer U.S. Pat. No. 3,448,979, patented June 10, 1969. The disclosure of such patent is hereby incorporated by reference.

At the exposure casing 16, the films 12 are adapted to move between front and rear intensifier screens 20 and 21, mounted on front and rear pressure plates 22 and 23. A mechanism is provided to feed successive X-ray films from the magazine 14 into the exposure casing 16, and then into the receiving magazine 18. Such mechanism is not shown but is fully disclosed in the above-mentioned Farmer patent.

A marking device 24 is provided to produce identifying markings on each successive X-ray film 12. The markings may indicate the name of the patient, the date, the sequence number, and any other desired data.

The marking device 24 is provided with a light-trap slot 26, through which an identification card 28 is inserted. It will be understood that various other identification members may be employed instead of the card 28.

As shown in FIG. 4, the card 28 carries various identifying markings 30 which it is desired to transfer to the X-ray film 12. These markings 30 may be written by hand or typewritten upon the card 28. The markings 30 are confined to a particular portion of the card 28, within a rectangular border line 32, printed or otherwise applied to the card 28.

The light-trap slot 26 is formed in a wall member 34, mounted on the front plate 22. The markings 30 on the card 28 are transferred photographically to the film 12. To provide for such transfer, the marking device 24 incorporates a plate-like lamp 36, preferably of the electro-luminescent type. Preferably, the wall member 34 is formed with a rectangular recess 38, into which the plate-like lamp 36 is fitted. It is preferred to provide a shield 40 to protect the lamp 36 from the X-rays. The shield 40 may be made of lead or any other material that is capable of preventing the transmission of the X-rays to the lamp 36. As shown, the shield 40 is in the form of a lead plate, fitted into the recess 38 along with the lamp 36. The lead plate 40 is disposed toward the front of the wall member 34, while the lamp 36 is toward the rear of the wall member.

The light-trap slot 26 guides the identification card 28 into a position just behind the lamp 36. A narrow space 42 is provided behind the lamp 36 to receive the card 28.

For reasons to be indicated presently, it is preferred to provide a fiber optic plate 44 between the identification card 28 and the X-ray film 12. The fiber optic plate 44 has the unusual characteristic of transmitting light along parallel lines only. Thus, the fiber optic plate 44 transmits the image of the identification card 28 to the X-ray film 12, without any appreciable blurring of the image. The fiber optic plate 44 is of the type in which a very large number of very fine glass fibers are bonded together in a bundle, with all of the fibers running in the same direction. The plate is sliced from the bundle and is suitable polished. The fibers extend through the plate 44 from front to rear, perpendicular to the front and rear surfaces of the plate 44.

It will be seen that the rear surface of the fiber optic plate 44 is flush with the rear side of the intensification screen 20. Thus, the screen 22 and the fiber optic plate 44 present smooth unbroken rear surfaces, without any appreciable irregularity. Accordingly, the X-ray film 12 can be fed along the intensification screen 20 and the fiber optic plate 44 without encountering any irregularity. This arrangement is much preferable to any arrangement in which the identification card 28 would directly engage the film 12, because any such arrangement would involve the hazard that the X-ray film 12 might be snagged by the card 28. Thus, the provision of the fiber optic plate 44 insures that the insertion of the card 28 will not cause the snagging or jamming of the X-ray film, as it is fed mechanically, into and out of the exposure casing 16.

It will be seen from FIGS. 2 and 3 that the electro-luminescent lamp 36 has a pair of contacts 46 between which a voltage may be impressed to energize the lamp. In this case, the contacts 46 are adapted to be engaged by contact plungers or pins 48 which are slidable from front to rear and are biased forwardly by coil springs 50. Each contact pin 48 has a reduced shank 52 which is slidable in a bushing 54. The shank portions 52 of the contact pins 46 are connected to an energizing circuit, whereby the lamp 36 is energized for a timed interval during the X-ray exposure. The timed interval is selected so that the lamp 36 will produce the proper photographic exposure on the X-ray film 12. The timed interval may be either the same as or different from the interval during which the X-ray film 12 is exposed to the X-rays.

The arrangement of the lamp contacts 46 in the spring pressed contact pins 48 makes it easy to open the exposure casing 16, if maintenance work becomes necessary. It is preferred to provide a hinged mounting for the front plate 22 so that the casing 16 can readily be opened. Occasionally, it may be necessary to open the casing 16 to remove a jammed X-ray film or to perform various other maintenance operations.

The electro-luminescent lamp 36 provides a rather low level of illumination. However, the light emitted by the lamp 36 is sufficient to provide a photographic latent image on the X-ray film 12, corresponding to the markings 30 on the identification card 28. The latent photographic image becomes visible when the X-ray film is developed in the normal manner. It will be seen that the identification markings are confined to one corner portion of the X-ray film 12.

FIGS. 5–10 illustrate another embodiment of the invention, in the form of a cassette 60 adapted to hold a single X-ray film 62. The cassette 60 is in the form of a light-tight casing for holding the X-ray film 62 while it is exposed to X-rays. The cassette is adapted to be slipped into the X-ray apparatus, before the exposure is begun. After the X-ray exposure has been made, the cassette 60 is taken into a dark room so that the exposed X-ray film can be removed and developed. A fresh X-ray film is then loaded into the cassette 60.

The cassette 60 preferably comprises front and back members 64 and 66, each of which is preferably molded in one piece of a suitable resinous plastic material. The front and back members 64 and 66 are preferably connected together along one edge by means of hinge elements 68 and 70, molded integrally thereon. Thus, the front and back members 64 and 66 can be swung apart for the removal and insertion of the X-ray films.

Locking means are preferably provided to hold the front and back members 64 and 66 together in their closed position. As shown to best advantage in FIG. 9, such locking means preferably comprise flexible detent flanges 72 and 74, formed on the edge portions of the members 64 and 66, along the edges thereof remote from the hinge elements 68 and 70. The detent elements 72 and 74 are adapted to snap together to hold the members 64 and 66 in their closed position. By manually applying pressure to the flanges 72 and 74, they can be moved apart so that the cassette 60 can be opened. As shown in FIG. 5, a fingernail slot 76 is preferably provided in one edge portion of the back member 66, to make it easy to open the cassette 60.

A light seal is provided around the periphery of the cassette 60, between the front and back members 64 and 66. As shown to best advantage in FIGS. 6, 8 and 9, such light seal comprises tongue and groove elements 78 and 80, on the members 64 and 66. In the illustrated construction, the tongue elements 78 are on the back member 66 while the groove elements 80 are formed in the front member 64. However, this situation could be reversed.

An intensifying screen 82 is preferably mounted within the cassette 60 so as to engage the X-ray film 62. As shown in FIGS. 6–8, the screen 82 is mounted on the front member 64.

To hold the X-ray film 62 with firm pressure, the front and back members 64 are preferably curved or arched slightly. The curvature extends between the hinge elements 68, 70 and the detent elements 72, 74 and is convex toward the inner side of each of the members 64 and 66. When the cassette 60 is closed, the members 64 and 66 are flattened out, but the arching or curvature of the members produces firm pressure against the X-ray film 62.

The cassette 60 is provided with a marking device 84, adapted to receive the identification card 28 of FIG. 4. The illustrated marking device 84 comprises an electro-luminescent lamp 86, preferably mounted in a recess 88, formed in the back member 66. A light-trap slot 89 is provided in one edge of the cassette 60, so that the identification card 28 can be inserted between the lamp 86 and the X-ray film 62. In this case, the identification card 28 directly engages the film 62 and it is not necessary to provide a fiber optic plate. There is no danger of snagging the film 62, because it remains immovable within the cassette 60, until the film is removed therefrom in the photographic dark room. The light from the lamp 86 shines through the card 28 and falls upon the film 62, so that the identifying markings 30 on the card 28 will produce a latent photographic image on the film. This image becomes visible when the film is developed in the normal manner.

Preferably, the cassette 60 is provided with a pair of rounded contact rivets 90 which are connected to the lamp 86. The contacts 90 are employed to energize the lamp 86. Moreover, the lamp 86 may be secured to the back member 66 by the contact rivets 90. It will be understood that the contacts 90 are connected to an energizing circuit when the cassette 60 is inserted into the X-ray apparatus at the exposure station. The energizing circuit is effective to supply an electrical voltage between the contacts 90 for the desired time interval, so as to produce the correct exposure, whereby the markings on the card 28 will be printed photographically upon the film 62. The energizing circuit includes a timer which is started automatically at the beginning of the X-ray exposure period. The exposure interval for the marking device 84 may be either the same as or different from the X-ray exposure time.

It will be evident that the present invention provides X-ray film marking devices which are effective, easy to use and economical. The marking devices of the present invention merely require the production of the typewritten identification card, and the insertion of the card into the light-trap slot in the marking device. The associated apparatus automatically energizes the electro-luminescent lamp for the correct interval to provide the desired exposure. The markings on the card are printed photographically on the X-ray film so that the markings become visible when the film is developed.

I claim:

1. A marking device for X-ray films,
   comprising light-tight holding means including a film receptacle for receiving an X-ray film,
   means for feeding successive films into and out of said receptacle,
   an electro-luminescent lamp mounted on said holding means opposite one side of the film,
   said lamp being in the form of a flat plate,
   said holding means having a wall portion with a recess therein for receiving said flat plate,
   a fiber optic member disposed between said lamp and a portion of the film,
   said holding means having a portion with a light-trap slot therein for receiving an identification member between said lamp and said fiber optic member,
   the identification member comprising a base sheet having identifying markings thereon,
   said base sheet and said markings differing in light transmissiveness,
   and means for selectively supplying an electrical voltage to said lamp so as to energize said lamp,
   said lamp being effective to illuminate the identifying markings on said identification member,
   the identification member being disposed between said lamp and said fiber optic member while said fiber optic member is sandwiched between the identification member and the film,
   said fiber optic member being of the type which transmits light along parallel paths,
   whereby said fiber optic member transfers the image of said identifying markings to the film so as to produce a latent photographic image of said markings on a portion of the film,
   said fiber optic member preventing any possible contact between the film and the identification member whereby the identification member cannot interfere with the feeding movement of the film.

2. A marking device according to claim 1,
   in which said film receptacle has entrance and exit means through which the successive films may be transported,
   said fiber optic member presenting a smooth surface to the films and preventing the identification member from interfering with the movement of the films.

3. A marking device according to claim 1,
   in which said fiber optic member is in the form of a flat plate having opposite flat surfaces for engaging the identification member and the films.

4. A marking device according to claim 3,
   in which said fiber optic member has a large number of parallel light-transmitting fibers extending between said flat surfaces and disposed perpendicular thereto.

* * * * *